US011985006B2

(12) United States Patent
Yasunori

(10) Patent No.: US 11,985,006 B2
(45) Date of Patent: May 14, 2024

(54) RELAY DEVICE

(71) Applicants:AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 429 days.

(21) Appl. No.: 17/278,709

(22) PCT Filed: Sep. 13, 2019

(86) PCT No.: PCT/JP2019/036050
§ 371 (c)(1),
(2) Date: Mar. 23, 2021

(87) PCT Pub. No.: WO2020/066687
PCT Pub. Date: Apr. 2, 2020

(65) Prior Publication Data
US 2022/0038307 A1 Feb. 3, 2022

(30) Foreign Application Priority Data
Sep. 25, 2018 (JP) .................................. 2018-179463

(51) Int. Cl.
*H04L 12/46* (2006.01)
*B60W 50/14* (2020.01)
(Continued)

(52) U.S. Cl.
CPC ............. *H04L 12/46* (2013.01); *B60W 50/14* (2013.01); *B60W 60/001* (2020.02); *H04B 3/36* (2013.01); *H04W 4/48* (2018.02); *B60W 2556/45* (2020.02)

(58) Field of Classification Search
CPC ....... H04L 12/46; H04W 4/48; B60W 60/001; B60W 50/14; B60W 2556/45; H04B 3/36
See application file for complete search history.

(56) References Cited

U.S. PATENT DOCUMENTS 11,541,832 B2 * 1/2023 Jiang ..................... G06F 11/349
11,575,538 B2 * 2/2023 Takahashi ............... H04L 12/40
(Continued)

FOREIGN PATENT DOCUMENTS

| JP | 2003-309584 A | 10/2003 |
| JP | 2004-173179 A | 6/2004 |
| JP | 2017-115439 A | 6/2017 |

OTHER PUBLICATIONS

International Search Report, Application No. PCT/JP2019/036050 dated Dec. 3, 2019. ISA/Japan Patent Office.

*Primary Examiner* — Chico A Foxx
(74) *Attorney, Agent, or Firm* — Honigman LLP

(57) ABSTRACT

A relay device to be installed in a vehicle, including: an external wireless communication unit that is configured to perform wireless communication with a communication device that is provided outside of the vehicle; a wired communication unit that is configured to perform wired communication with an ECU for controlling an in-vehicle device that is installed in the vehicle; an in-vehicle wireless communication unit that is configured to perform wireless communication with the ECU; and a communication control unit that is configured to identify information transmitted from the communication device and control communication performed by the wired communication unit or the in-
(Continued)

vehicle wireless communication unit in accordance with a result of the identification.

14 Claims, 4 Drawing Sheets

(51) Int. Cl.
*B60W 60/00* (2020.01)
*H04B 3/36* (2006.01)
*H04W 4/48* (2018.01)

(56) References Cited

U.S. PATENT DOCUMENTS

| | | | |
|---|---|---|---|
| 11,669,323 B2* | 6/2023 | Harata | B60W 50/00 |
| | | | 717/169 |
| 11,685,359 B2* | 6/2023 | Harata | G06F 16/183 |
| | | | 701/36 |
| 11,709,666 B2* | 7/2023 | Harata | G06F 21/572 |
| | | | 717/172 |
| 2007/0104168 A1 | 5/2007 | Polson | |
| 2015/0124597 A1* | 5/2015 | Mabuchi | H04L 47/24 |
| | | | 370/230 |
| 2015/0301822 A1* | 10/2015 | Takahashi | B60R 16/023 |
| | | | 717/173 |
| 2016/0352533 A1* | 12/2016 | Talty | H04L 12/4015 |
| 2017/0021768 A1* | 1/2017 | Jaegal | H04R 1/326 |
| 2018/0226077 A1* | 8/2018 | Choi | B60K 35/00 |
| 2019/0286433 A1* | 9/2019 | Sawada | G06F 8/65 |
| 2020/0007661 A1* | 1/2020 | Kim | H04L 67/01 |
| 2020/0137099 A1* | 4/2020 | Haga | H04L 63/1416 |
| 2020/0145252 A1* | 5/2020 | Torisaki | H04W 4/40 |
| 2022/0006667 A1* | 1/2022 | Yasunori | B60R 16/02 |
| 2022/0029855 A1* | 1/2022 | Yasunori | B60R 16/023 |

\* cited by examiner

FIG. 3

| ASIL level | Example of corresponding ECU |
|---|---|
| QM | HMI-related ECU, air conditioner ECU |
| ASIL-A | Body-related ECU such as door mirror control |
| ASIL-B | Traveling control-related ECU related to driving control and the like |
| ASIL-C | Traveling control-related ECU related to braking control or the like |
| ASIL-D | Automated driving-related ECU related to automated driving control |

RELAY DEVICE

CROSS-REFERENCE TO RELATED APPLICATIONS

This application is the U.S. national stage of PCT/JP2019/036050 filed on Sep. 13, 2019, which claims priority of Japanese Patent Application No. JP 2018-179463 filed on Sep. 25, 2018, the contents of which are incorporated herein.

TECHNICAL FIELD

The present disclosure relates to a relay device.

BACKGROUND

Vehicles are installed with ECUs (Electronic Control Units) for controlling in-vehicle apparatuses, such as powertrain-related ECUs for engine control and the like, and body-related ECUs for air conditioner control and the like. Furthermore, if a vehicle has an automated driving function, the vehicle may be installed with ECUs that control in-vehicle apparatuses used for automated driving. Groups of such ECUs may be connected to an in-vehicle LAN with use of a CAN (Controller Area Network) or Ethernet (registered trademark), and may be connected to a communication device outside of the vehicle via an external network with the use of a relay device that has wireless functionality (see JP 2017-115439A, for example).

JP 2017-115439A discloses a relay device that has wireless functionality, includes an in-vehicle communication module that is used with a telematics service, and communicates with a communication device outside of the vehicle via a public communication network. Also, the relay device is connected to body ECUs and power unit control ECUs via an in-vehicle LAN. Note that a wireless public communication network is a network in which communication is performed using a communication standard such as 4G or LTE (Long Term Evolution), and the bandwidth of such communication standards may be from tens of Mbps to 150 Mbps.

The bandwidth of 5G, which is a next-generation communication standard, is high bandwidth that exceeds several Gbps. In contrast to this, there is concern that the low bandwidth of the in-vehicle LAN that connects the relay device having wireless functionality of JP 2017-115439A and the ECU to each other will not be able to sufficiently handle the high bandwidth communication of a giga-order of several Gbps received from outside of the vehicle.

The present disclosure has been made in view of this situation, and an object thereof is to provide a relay device that improves the ability to handle communication received from outside of a vehicle.

SUMMARY

A relay device according to an aspect of the present disclosure is a relay device to be installed in a vehicle, including: an external wireless communication unit that is configured to perform wireless communication with a communication device that is provided outside of the vehicle; a wired communication unit that is configured to perform wired communication with an ECU for controlling an in-vehicle device that is installed in the vehicle; an in-vehicle wireless communication unit that is configured to perform wireless communication with the ECU; and a communication control unit that is configured to identify information transmitted from the communication device and control communication performed by the wired communication unit or the in-vehicle wireless communication unit in accordance with a result of the identification.

Advantageous Effects of Disclosure

With one aspect of the present disclosure, it is possible to provide a relay device that improves the ability to handle communication received from outside of a vehicle.

BRIEF DESCRIPTION OF DRAWINGS

FIG. 3 is an illustrative diagram related to priority levels of the traveling safety of ECUs.

DETAILED DESCRIPTION OF PREFERRED EMBODIMENTS

Figure 1:
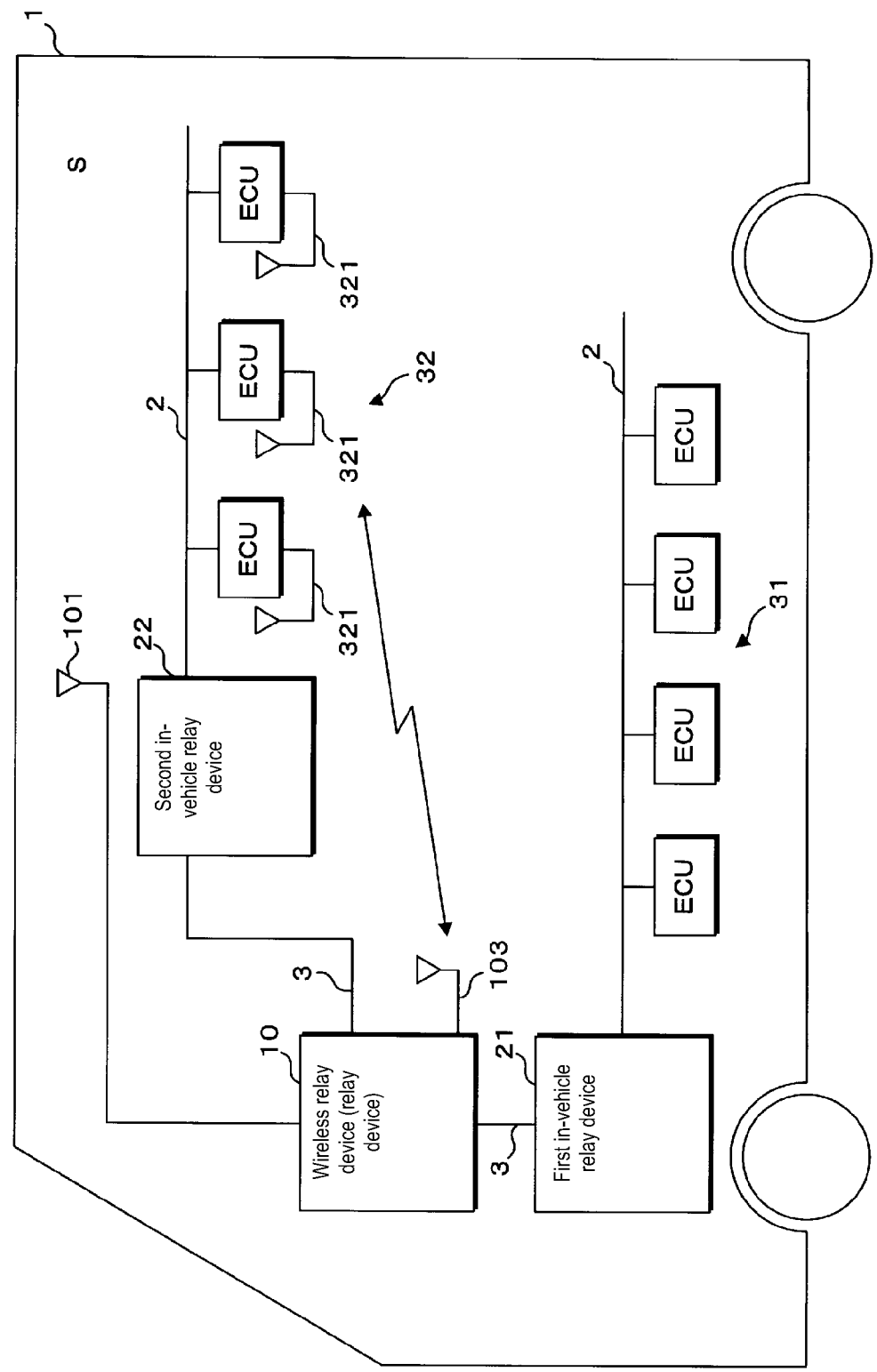
FIG. 1 is a schematic diagram showing a configuration of a relay device system that includes a wireless relay device according to a first embodiment.

First, embodiments of the present disclosure will be listed and described. Also, at least parts of the embodiments described below can be freely combined.

A relay device according to an aspect of the present disclosure is a relay device to be installed in a vehicle, including: an external wireless communication unit that is configured to perform wireless communication with a communication device that is provided outside of the vehicle; a wired communication unit that is configured to perform wired communication with an ECU for controlling an in-vehicle device that is installed in the vehicle; an in-vehicle wireless communication unit that is configured to perform wireless communication with the ECU; and a communication control unit that is configured to identify information transmitted from the communication device and control communication performed by the wired communication unit or the in-vehicle wireless communication unit in accordance with a result of the identification.

With the present aspect, the relay device includes a wired communication unit that performs wired communication with the ECUs, an in-vehicle wireless communication unit that performs wireless communication with the ECUs and a communication control unit, and the communication control unit identifies information transmitted from the communication device and controls communication performed by the wired communication unit and the in-vehicle wireless communication unit, in accordance with the result of the identification. Accordingly, even if a communication device provided outside of the vehicle and the in-vehicle wireless communication unit perform high-bandwidth communication and information having a large data volume is transmitted from the communication device, it is possible to handle high-bandwidth communication by controlling communication performed by the wired communication unit or the in-vehicle wireless communication unit in accordance with the result of identifying the transmitted information, and thus secure the quality of communication between the communication device and the ECUs.

The relay device according to another aspect of the present disclosure has a configuration wherein the ECU includes a first ECU and a second ECU that has a priority level related to traveling safety of the vehicle that is lower than the priority level of the first ECU, the wired communication unit includes a first wired communication unit that is configured to perform wired communication with the first ECU, and a second wired communication unit that is configured to perform wired communication with the second ECU, the in-vehicle wireless communication unit is configured to perform wireless communication with the second ECU, and the communication control unit prioritizes communication between the external wireless communication unit and the first wired communication unit over communication between the external wireless communication unit and the second wired communication unit.

With the present aspect, the relay device prioritizes the first wired communication unit over the second wired communication unit in performing communication with the communication device that is provided outside of the vehicle. Accordingly, even if the communication with the communication device provided outside of the vehicle is high-bandwidth communication, it is possible to secure the quality of communication between the first ECUs and the communication device because communication performed by the first wired communication unit, which is connected to the first ECUs having a high priority level related to the traveling safety of the vehicle, is given higher priority.

The relay device according to another aspect of the present disclosure has a configuration wherein bandwidth of the first wired communication unit is wider than bandwidth of the second wired communication unit.

With the present aspect, the bandwidth of the first wired communication unit is wider than the bandwidth of the second wired communication unit, and it is therefore possible to secure the quality of communication between the first ECUs and the communication device.

The relay device according to another aspect of the present disclosure has a configuration wherein the communication control unit identifies information transmitted from the communication device based on an address of an ECU serving as a destination included in the information transmitted from the communication device or the type of content included in the information transmitted from the communication device, and controls communication performed by the wired communication unit or the in-vehicle wireless communication unit in accordance with a result of the identification.

With the present aspect, the communication control unit identifies information transmitted from the communication device based on the addresses of the ECUs that are the destination included in the information or the type of content included in the information and controls communication performed by the wired communication unit or the in-vehicle wireless communication unit. Accordingly, based on the results of identifying the transmitted information, it is possible to relay information related to the first ECUs, which have a high priority level, via the first wired communication unit and secure the quality of communication between the first ECUs and the communication device.

The relay device according to another aspect of the present disclosure has a configuration wherein the communication control unit controls the volume of communication performed by the second wired communication unit and the in-vehicle wireless communication unit based on the volume of communication performed by the external wireless communication unit.

With the present aspect, based on the volume of communication performed by the external wireless communication unit, it is possible to secure the quality of communication between the second ECUs and the communication device by controlling the volume of communication performed by the second wired communication unit and the in-vehicle wireless communication unit.

The relay device according to another aspect of the present disclosure has a configuration wherein the communication control unit increases the volume of communication of the in-vehicle wireless communication unit in communicating with the second ECU, in accordance with an increase in the volume of communication performed by the external wireless communication unit.

With the present aspect, if the volume of communication performed by the external wireless communication unit increases, it is possible to secure the quality of communication between the second ECUs and the communication device by increasing the volume of communication with the in-vehicle wireless communication unit in communicating with the second ECUs.

The relay device according to another aspect of the present disclosure has a configuration wherein the first ECU includes an automated driving-related ECU, and the automated driving-related ECU communicates data related to automated driving with the communication device via the external wireless communication unit, and the second ECU includes an HMI-related ECU that controls an HMI-related device that includes an entertainment device, and the HMI-related ECU communicates entertainment-related data with the communication device via the external wireless communication unit.

With the present aspect, along with securing the quality of communication of data related to automated driving that is communicated between the communication device and the automated driving-related ECU, it is possible to use the second wired communication unit and the in-vehicle wireless communication unit to handle a large data volume even if the entertainment-related data communicated between the communication device and the HMI-related ECU is a large data volume.

The following specifically describes the present disclosure with reference to the drawings showing embodiments thereof. A relay device according to embodiments of the present disclosure will be described below with reference to the drawings. Note that the present disclosure is not limited to these illustrative examples and is defined by the claims, and all changes which come within the meaning and range of equivalency of the claims are intended to be embraced therein.

First Embodiment

The following describes an embodiment with reference to the drawings. FIG. 1 is a schematic diagram showing a configuration of a relay device system S that includes a wireless relay device 10 according to a first embodiment. The relay device system S is installed in a vehicle 1, and includes the wireless relay device 10 and a plurality of in-vehicle relay devices (a first in-vehicle relay device 21 and a second in-vehicle relay device 22).

The wireless relay device 10 is communicably to the first in-vehicle relay device 21 and the second in-vehicle relay device 22 via corresponding communication lines 3. That is to say, the first in-vehicle relay device 21 and the second in-vehicle relay device 22 constitute a star network topology with the wireless relay device 10 at the center thereof, or a tree network topology with the wireless relay device 10 as the root node thereof.

The wireless relay device 10 is connected to an external connection antenna 101 for wirelessly communicating with a communication device (not shown) outside of the vehicle. Accordingly, if the communication device outside of the vehicle is assumed to be upstream, the wireless relay device 10 is positioned the most upstream, and the first in-vehicle relay device 21 and the second in-vehicle relay device 22 downstream of the wireless relay device 10 are connected in parallel to each other. The wireless relay device 10 is connected to the first in-vehicle relay device 21 and the second in-vehicle relay device 22 positioned downstream by the communication lines 3, which may be Ethernet (registered trademark) cables for example.

The wireless relay device 10 wirelessly communicates with the communication device outside of the vehicle and transmits (relays) various types of data received by wireless communication to the first in-vehicle relay device 21 and the second in-vehicle relay device 22. The wireless relay device 10 is equivalent to a relay device that uses a wired or wireless connection to relay communication between the communication device outside of the vehicle and ECUs (Electronic Control Units) that will be described later installed in the vehicle. The wireless relay device 10 is connected to an internal connection antenna 103 for wireless communication with second ECUs 32 included in the ECUs.

The first in-vehicle relay device 21 and the second in-vehicle relay device 22 are communicably connected to the ECUs (the first ECUs 31 and the second ECUs 32) that control in-vehicle devices by ECU wiring 2 such as a CAN (Controller Area Network/registered trademark) cable or an Ethernet cable. The first ECUs 31 are connected to the first in-vehicle relay device 21. The second ECUs 32 are connected to the second in-vehicle relay device 22. Although described later in detail, the priority levels, which are related to the traveling safety of the vehicle 1, of the functions of the second ECUs 32 or the in-vehicle devices that are to be controlled are lower than the priority levels of the first ECUs 31.

The second ECUs 32 that are connected to the second in-vehicle relay device 22 include internal connection antennas 321 for wirelessly communicating with the wireless relay device 10. Note that rather than all of the second ECUs 32 including the internal connection antennas 321 for wirelessly communicating with the wireless relay device 10, configurations are also possible in which some of the second ECUs 32 include the internal connection antennas 321.

The first in-vehicle relay device 21 and the second in-vehicle relay device 22 receive data transmitted from the wireless relay device 10, that is to say, data transmitted from the communication device outside of the vehicle via the wireless relay device 10, and transmit (relay) the data to the first ECUs 31 or the second ECUs 32 that are connected to the in-vehicle relay device that received the transmitted data.

The wireless relay device 10, the first in-vehicle relay device 21, and the second in-vehicle relay device 22 relay communications between the ECUs (the first ECUs 31 and the second ECUs 32) and the communication device outside of the vehicle via wired communication. Furthermore, the wireless relay device 10 also relays communications between the second ECUs 32 that include the internal connection antennas 321 and the communication device outside of the vehicle via wireless communication.

The number of in-vehicle relay devices including the first in-vehicle relay device 21 and the second in-vehicle relay device 22 is not limited to two. Configurations are possible in which there are a plurality of each of the first in-vehicle relay device 21 and the second in-vehicle relay device 22, and the number of in-vehicle relay devices including the first in-vehicle relay device 21 and the second in-vehicle relay device 22 is three or more.

Figure 2:
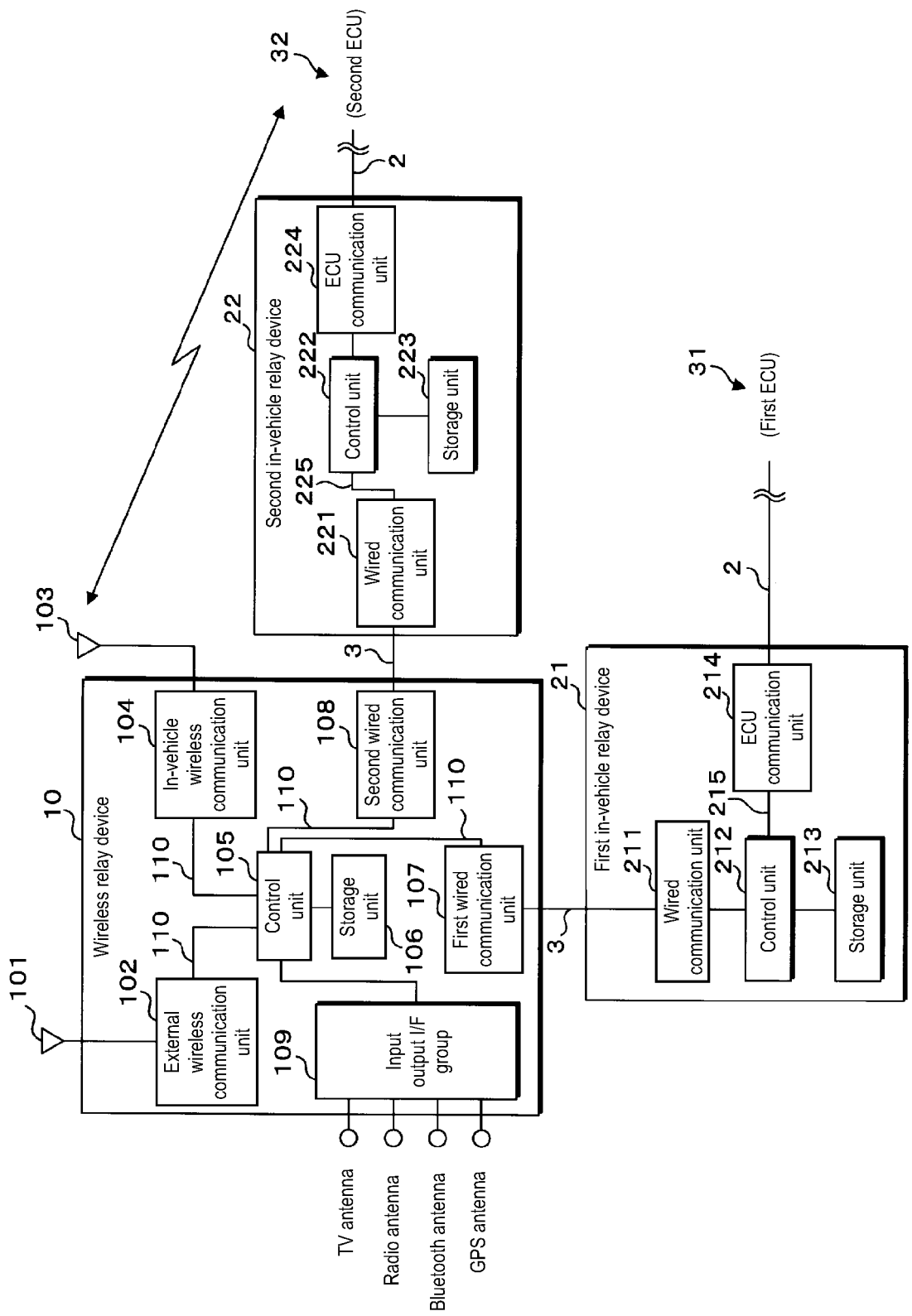
FIG. 2 is a block diagram showing a configuration of the wireless relay device.

FIG. 2 is a block diagram showing a configuration of the wireless relay device 10. The wireless relay device 10 includes an external wireless communication unit 102, an in-vehicle wireless communication unit 104, a control unit 105, a storage unit 106, a first wired communication unit 107, a second wired communication unit 108, and an input-output I/F group 109, and is connected to the external connection antenna 101 and the internal connection antenna 103. Note that the wireless relay device 10 may also include the external connection antenna 101 and the internal connection antenna 103.

The external wireless communication unit 102 is connected via a harness or the like to the external connection antenna 101 for wirelessly communicating with the communication device outside of the vehicle. The external wireless communication unit 102 uses a predetermined wide-area communication standard such as 5G, 4G, LTE, or the like to wirelessly communicates with the communication device outside of the vehicle, and is a communication device that may be referred to as a TCU (Telematics Communication Unit), for example.

The in-vehicle wireless communication unit 104 is connected via a harness or the like to the internal connection antennas 103 for wirelessly communicating with the second ECUs 32 that include the internal antennas 321. The in-vehicle wireless communication unit 104 is a device for wirelessly communicating with these second ECUs 32 using a predetermined short range communication standard such as WiFi (registered trademark), Bluetooth (registered trademark), or the like.

The control unit 105 may be constituted by a CPU (Central Processing Unit), an MPU (Micro Processing Unit), or the like, and performs various types of control processing and arithmetic processing by reading and executing control programs and data previously stored on the storage unit 106. The control unit 105 is communicably connected via internal buses 110 to the external wireless communication unit 102, the in-vehicle wireless communication unit 104, the first wired communication unit 107, the second wired communication unit 108, and the input-output I/F group 109. The control unit 105 performs control to relay data that is communicated to the external wireless communication unit 102, the in-vehicle wireless communication unit 104, the first wired communication unit 107, and the second wired communication unit 108 by executing the control programs.

The control programs include security programs for ensuring the security of the wireless relay device 10. The control unit 105 executes security programs to exhibit security functions to handle unauthorized communication (attacks) from outside of the vehicle by way of, for example, DoS attacks or data that includes viruses, worms, or the like, and thus ensure the security (secure a secure state of communication) of the wireless relay device 10.

The storage unit 106 is constituted by a volatile memory element such as RAM (Random Access Memory), or a non-volatile memory element such as ROM (Read Only Memory), EEPROM (Electrically Erasable Programmable RAM), or flash memory, and has control programs and data that is referenced when processing is performed stored thereon in advance. The control programs stored on the storage unit 106 may also be control programs that are read out from a storage medium (not shown) readable by the wireless relay device 10 and stored on the storage unit 106. Also, the control programs may also be downloaded from an external computer (not shown) that is connected to a communication network (not shown) and stored on the storage unit 106.

Path information for communicating with the first in-vehicle relay device 21, the second in-vehicle relay device 22, the first ECUs 31, and the second ECUs 32 is stored on the storage unit 106 in table form, for example. The path information includes addresses of the first in-vehicle relay device 21, the second in-vehicle relay device 22, and ECUs (the first ECUs 31 and the second ECUs 32) that are connected to the first in-vehicle relay device 21 and the second in-vehicle relay device 22. The second ECUs 32 that include the internal connection antennas 321 have two addresses, namely an address for wired communication such as communication via Ethernet and an address for wireless communication such as communication via WiFi, and the two addresses are included in the path information. Accordingly, by referencing the path information stored on the storage unit 106, the control unit 105 can relay communications between the ECUs (the first ECUs 31 and the second ECUs 32) and a communication device outside of the vehicle.

The first wired communication unit 107 and the second wired communication unit 108 are input-output I/Fs such as Ethernet communication ports, for example, and the protocols of the physical layers thereof may be of IEEE standards such as 100 BASE-T1 or 1000 BASE-T1, for example.

The input-output I/F group 109 is constituted by devices that include input-output processing units that are configured to connect to various types of antennas connected to the wireless relay device 10, such as TV antennas, radio antennas, Bluetooth antennas, or GPS antennas. The input-output I/F group 109 decodes or coverts the format of data received by the various types of antennas listed above, and outputs the decoded or converted data to the control unit 105. Alternatively, a configuration is also possible in which the input-output I/F group 109 and another in-vehicle device such as a display device are directly connected by a coaxial cable for example, and can perform tasks such as outputting and displaying data received by the antenna on the display device or the like.

The wireless relay device 10 includes a communication control unit that identifies information transmitted from communication devices and controls communication by the first wired communication unit 107, the second wired communication unit 108, or the in-vehicle wireless communication unit 104, in accordance with the result of the identification. The control unit 105 of the wireless relay device 10 functions as a communication control unit by executing a control program. During communication with a communication device provided outside of the vehicle 1, the communication control unit identifies information transmitted from the communication device and, based on the result of the identification, performs control related to whether communication is to be performed by the first wired communication unit 107, the second wired communication unit 108, or the in-vehicle wireless communication unit 104, that is to say that the communication control unit performs control related to relay paths.

Information identified by the communication control unit may be, for example, addresses of communication devices that have transmitted information, addresses of ECUs (the first ECUs 31 and the second ECUs 32) that are destinations of transmitted information, frame types of the information, or port numbers indicating the type of communication of the information. Alternatively, by referencing content data that forms an application layer, such as data related to automated driving control or entertainment-related data such as VOD (Video On Demand) included in the transmitted information, the communication control unit can also use the content data as information to be identified. The information to be identified by the communication control unit may be set using a QoS (Quality of Service) function, for example. By using a QoS function, it is possible to efficiently set the priority level of the types of information to be identified and the content of control corresponding to the priority level. That is to say, the communication control unit can determine the bandwidth of communication paths when sending, receiving, or relaying information, set the upper limit value of the volume of communication within a predetermined period of time, or the order (priority ranking) of relay processing or the like, all based on the priority level of each type of information. By referencing, for example, QoS setting files pre-stored on the storage unit 106 or path information that contains addresses of the first in-vehicle relay device 21, the second in-vehicle relay device 22, and the ECUs (the first ECUs 31 and the second ECUs 32), the communication control unit determines the priority level and relay path of the information transmitted from the communication device. The communication control unit controls the volume of communication performed by the second wired communication unit 108 and the in-vehicle wireless communication unit 104 based on the volume of communication performed by the external wireless communication unit 102.

The second ECUs 32 that include the internal connection antennas 321 are connected to the second in-vehicle relay device 22, which is connected to the second wired communication unit 108. These second ECUs 32 are configured to wirelessly communicate with the wireless relay device 10. Accordingly, the wireless relay device 10 and the second ECUs 32 perform communication with the use of two paths, namely wired communication via the second wired communication unit 108 and the second in-vehicle relay device 22, and wireless communication via the in-vehicle wireless communication unit 104. If the volume of communication performed via the external wireless communication unit 102 is equal to or higher than a predetermined value for example, the communication control unit can handle the increased volume of communication with the second ECUs 32 by performing wired communication with use of the second wired communication unit 108, and performing wireless communication with use of the in-vehicle wireless communication unit 104.

The communication control unit may also increase the volume of communication performed by wireless communication via the in-vehicle wireless communication unit 104, in accordance with an increase in the volume of communication performed via the external wireless communication unit 102. That is to say, in communicating with the second ECUs 32*s*, the communication control unit increases the volume of communication performed by the in-vehicle wireless communication unit 104 in accordance with an increase in the volume of communication of the external wireless communication unit 102, while controlling the volume of communication performed by the second wired communication unit 108 to be constant. By using the two paths, namely the wired path and the wireless path, the communication control unit can handle an increase in the volume of communication between a communication device and the second ECUs 32. Increasing the volume of communication performed by the in-vehicle wireless communication unit 104 increases the ratio of the volume of communication performed by the in-vehicle wireless communication unit 104 (relative) to the volume of communication performed by the second wired communication unit 108.

Based on the results of identifying information transmitted from a communication device outside of the vehicle, the communication control unit determines the priority level and relay path for relay processing or the like, and, in communicating with the second ECUs 32 having low priority levels, relays with use of the two paths, namely the wired path and the wireless path, in accordance with the communicative volume of the information transmitted from the communication device outside of the vehicle. Accordingly, even if the communicative volume of the information transmitted from a communication device outside of the vehicle is large, it is possible to secure the quality of communication with the first ECUs 31 having high priority levels and efficiently handle the increase in the volume of communication with the second ECUs 32 having low priority levels.

The first in-vehicle relay device 21 includes a wired communication unit 211, a control unit 212, a storage unit 213, and an ECU communication unit 214. The control unit 212 of the first in-vehicle relay device 21 has a configuration that is similar to that of the control unit 105 of the wireless relay device 10 described above. The control unit 212 of the first in-vehicle relay device 21 is communicably connected to the wired communication unit 211 and the ECU communication unit 214 by an internal bus 215. The control unit 212 performs control to relay data to be communicated to the wired communication unit 211 and the ECU communication unit 214 by reading out and executing control programs and data stored on the storage unit 213.

The control programs of the first in-vehicle relay device 21 may also include security programs for ensuring the security of the first in-vehicle relay device 21, similarly to the control programs of the wireless relay device 10. The control unit 212 of the first in-vehicle relay device 21 exhibits security functions to handle unauthorized communication (attacks) such as data containing a virus and thus ensure the security of the first in-vehicle relay device 21.

The storage unit 213 of the first in-vehicle relay device 21 has a configuration that is similar to that of the storage unit 106 of the wireless relay device 10 described above. Path information for communicating with the wireless relay device 10, the second in-vehicle relay device 22, and the ECUs (the first ECUs 31 and the second ECUs 32) is stored on the storage unit 213 of the first in-vehicle relay device 21 in table form for example, similarly to the storage unit 106 of the wireless relay device 10. The path information includes the addresses of the wireless relay device 10, the first in-vehicle relay device 21, the second in-vehicle relay device 22, and the ECUs (the first ECUs 31 and the second ECUs 32).

The first in-vehicle relay device 21, the second in-vehicle relay device 22, and the wireless relay device 10 may function as a layer 2 switch or a layer 3 switch, for example. If the first in-vehicle relay device 21, the second in-vehicle relay device 22, and the wireless relay device 10 function as a layer 2 switch, the MAC addresses of the first in-vehicle relay device 21, the second in-vehicle relay device 22, the wireless relay device 10, and the ECUs (the first ECUs 31 and the second ECUs 32) are stored on the storage unit 213 as path information. If the first in-vehicle relay device 21, the second in-vehicle relay device 22, and the wireless relay device 10 function as a layer 3 switch, the IP addresses of the first in-vehicle relay device 21, the second in-vehicle relay device 22, the wireless relay device 10, and the ECUs (the first ECUs 31 and the second ECUs 32) are stored on the storage unit 213 as path information. Accordingly, by referencing the path information stored on the storage unit 213, the control unit 212 of the first in-vehicle relay device 21 can relay communication between the first ECUs 31 connected to the first in-vehicle relay device 21 and a communication device outside of the vehicle, or communication between the first ECUs 31 connected to the first in-vehicle relay device 21 and the second ECUs 32 that are connected to the second in-vehicle relay device 22, which is another relay device.

The wired communication unit 211 of the first in-vehicle relay device 21 conforms to standards that are similar to that of the first wired communication unit 107 of the wireless relay device 10, is an input-output I/F such as Ethernet communication port, and the protocols of physical layers may be 100 BASE-T1 or 1000 BASE-T1, for example. The wired communication unit 211 of the first in-vehicle relay device 21 and the first wired communication unit 107 of the wireless relay device 10 are connected by the communication line 3 via an Ethernet cable such as that of 100 BASE-T1 or 1000 BASE-T1, for example.

The ECU communication unit 214 is an input-output I/F compliant with a predetermined communication protocol such as Ethernet or CAN. The ECU communication unit 214 and the first ECUs 31 are communicably connected to each other by the ECU wiring 2, which may be constituted by Ethernet cables, CAN cables, or the like.

The second in-vehicle relay device 22, similarly to the first in-vehicle relay device 21, includes a wired communication unit 221, a control unit 222, storage unit 223, and an ECU communication unit 224. The control unit 222 is communicably connected to the wired communication unit 221 and the ECU communication unit 224 via an internal bus 225. The wired communication unit 221, the control unit 222, the storage unit 223, and the ECU communication unit 224 of the second in-vehicle relay device 22 have a configuration similar to that of the first in-vehicle relay device 21. The storage unit 223 of the second in-vehicle relay device 22 has path information stored thereon, similarly to the first in-vehicle relay device 21. The wired communication unit 221 of the second in-vehicle relay device 22 and the second wired communication unit 108 of the wireless relay device 10 are connected by the communication line 3 via an Ethernet cable such as that of 100 BASE-T1 or 1000 BASE-T1, for example. The ECU communication unit 224 of the second in-vehicle relay device 22 and the second ECUs 32 are communicably connected to each other by the ECU wiring 2 constituted by Ethernet cables, CAN cables, or the like.

The ECUs (the first ECUs 31 and the second ECUs 32) are connected to the first in-vehicle relay device 21 and the second in-vehicle relay device 22 via the ECU communication units 214 and 224, respectively. That is to say, the first ECUs 31 are connected to the first in-vehicle relay device 21, and the second ECUs 32 are connected to the second in-vehicle relay device 22. The ECUs (the first ECUs 31 and the second ECUs 32) are constituted by programs for controlling the corresponding in-vehicle devices and microcomputers and the like for executing the programs.

The second ECUs 32 that are connected to the second in-vehicle relay device 22 include the internal connection antennas 321 (see FIG. 1) for wireless communication with the wireless relay device 10, and wireless communication units (not shown) that are connected to the internal connection antennas 321. The microcomputers of the second ECUs 32 are connected to the corresponding wireless communication units, or the microcomputers also have the functions of the wireless communication units, and therefore the second ECUs 32 are configured to perform wireless communication with the wireless relay device 10.

FIG. 3 is an illustrative diagram related to priority levels of the traveling safety of the ECUs. The priority levels of the ECUs (the first ECUs 31 and the second ECUs 32) related to the traveling safety of the vehicle 1 are determined based on the corresponding in-vehicle devices and the functions of the programs to be executed, and may also be determined based on, for example, ASIL (Automotive Safety Integrity Level) in ISO 26262. As shown in FIG. 3, the ASIL levels are classified into levels QM, ASIL-A, ASIL-B, ASIL-C, and ASIL-D. The QM level is normal quality management in which it is not necessary to apply functional safety according to ISO 26262. The ASIL-A to ASIL-D levels are levels at which functional safety needs to be applied in accordance with ISO 26262, and the functional safety requirements become stricter from ASIL-A to ASIL-D. That is to say, the QM level can be regarded as the lowest priority level, and the ASIL-D level can be regarded as the highest priority level.

As the ECUs corresponding to the ASIL levels, for example ECUs that correspond to the QM level may be HMI (Human Machine Interface)-related ECUs that control or process entertainment-related data such as moving image data or streaming data handled by an HMI device such as car navigation and TV. For example, the second ECUs 32 include the HMI-related ECUs and are ECUs that correspond to the QM level. The second ECUs 32 may also include ECUs that correspond to the QM level such as air conditioner ECUs that control car air conditioners.

ECUs that correspond to the ASIL-A level are body-related ECUs that control the positions of the seats, control the door mirrors, or the like. The ECUs that correspond to the ASIL-B level are traveling control-related ECUs related to control such as driving control of engines, motors, or the like. The ECUs corresponding to the ASIL-C level are traveling control-related ECUs related to control such as steering control or brake control. The ECUs corresponding to the ASIL-D level are automated driving-related ECUs related to automated driving control. For example, the first ECUs 31 may include the automated driving-related ECUs and be ECUs corresponding to the ASIL-D level.

The priority levels of the first ECUs 31 and the second ECUs 32 in relation to the traveling safety of the vehicle 1 are not limited to the above description, and the first ECUs 31 may also include ECUs that correspond to the ASIL-B, ASIL-C, or ASIL-D levels, and the second ECUs 32 may also include ECUs that correspond to the QM level and the ASIL-A level. That is to say, it could be said that between the first ECUs 31 connected to the first in-vehicle relay device 21 and the second ECUs 32 connected to the second in-vehicle relay device 22, the priority levels of the first ECUs 31 in relation to the traveling safety of the vehicle 1 are higher than the priority levels of the second ECUs 32 in relation to the traveling safety of the vehicle 1.

Alternatively, with the priority levels of the ECUs in relation to the traveling safety of the vehicle 1, the priority level of the automated driving-related ECUs is the highest, the priority level of the ECUs that perform control related to the turning or stopping of the vehicle 1 is the next highest, and the priority level of the ECUs that perform control related to the traveling of the vehicle 1 is the next highest. Also, configurations are also possible in which the priority level of ECUs that perform control other than the forms of control mentioned above, such an HMI-related ECUs that control HMI-related devices, is the lowest.

As described above, the ECUs (the first ECUs 31 and the second ECUs 32) are connected to the first in-vehicle relay device 21 and the second in-vehicle relay device 22, respectively. The first ECUs 31 connected to the first in-vehicle relay device 21 have a higher priority level in relation to the traveling safety of the vehicle 1 than that of the second ECUs 32 connected to the second in-vehicle relay device 22. That is to say that the first in-vehicle relay device 21 is a relay device having a higher priority level related to the traveling safety of the vehicle 1 than that of the second in-vehicle relay device 22.

The bandwidth (throughput) of the wired communication unit of the first in-vehicle relay device 21 is desirably configured to be wider (greater) than the bandwidth (throughput) of the wired communication unit of the second in-vehicle relay device 22. The bandwidth (throughput) of the first wired communication unit 107 of the wireless relay device 10 connected to the wired communication unit 211 of the first in-vehicle relay device 21 is desirably configured to be wider (greater) than the bandwidth (throughput) of the second wired communication unit 108 of the wireless relay device 10 connected to the wired communication unit 221 of the second in-vehicle relay device 22. That is to say that the communication lines 3 that connect the wired communication units 107, 108, 211, 221, and the wired communication unit are configured such that the speed of communication of wired communication between the wireless relay device 10 and the first in-vehicle relay device 21 is faster than the speed of communication of wired communication between the wireless relay device 10 and the second in-vehicle relay device 22. An example of this would be the bandwidth between the wireless relay device 10 and the first in-vehicle relay device 21 being 1 Gbps and the bandwidth between the wireless relay device 10 and the second in-vehicle relay device 22 being 100 Mbps.

In this way, by making the bandwidth between the wireless relay device 10 and the first in-vehicle relay device 21 wider than the bandwidth between the wireless relay device 10 and the second in-vehicle relay device 22, it is possible to perform high-speed communication between the first ECUs 31 connected to the first in-vehicle relay device 21 and a communication device outside of the vehicle. The first ECUs 31 have a higher priority level related to the traveling safety of the vehicle 1 than that of the second ECUs 32 connected to the second in-vehicle relay device 22. Accordingly, the traveling safety of the vehicle 1 can be efficiently secured by performing high-speed communication between the first ECUs 31 having a high priority level related to the traveling safety of the vehicle 1 and a communication device outside of the vehicle. Note that the relationship between the bandwidth between the wireless relay device 10 and the first in-vehicle relay device 21 and the bandwidth between the wireless relay device 10 and the second in-vehicle relay device 22 are not limited to the above description, and both bandwidths may also be the same.

Configurations are also possible in which the wireless relay device 10 makes the network buffer region for the first wired communication unit 107 larger than the network buffer region for the second wired communication unit 108. A network buffer region, for example, is a predetermined region that is ensured on the storage unit 106 of the wireless relay device 10, for example, and is a region in which data to be relayed by the wireless relay device 10 is temporarily stored. By increasing the size of the network buffer region for the first wired communication unit 107 in this way, it is possible to suppress the buffer overflow in communication via the first wired communication unit 107 and to reduce the number of times that the communication device outside of the vehicle is requested to resend information.

Figure 4:
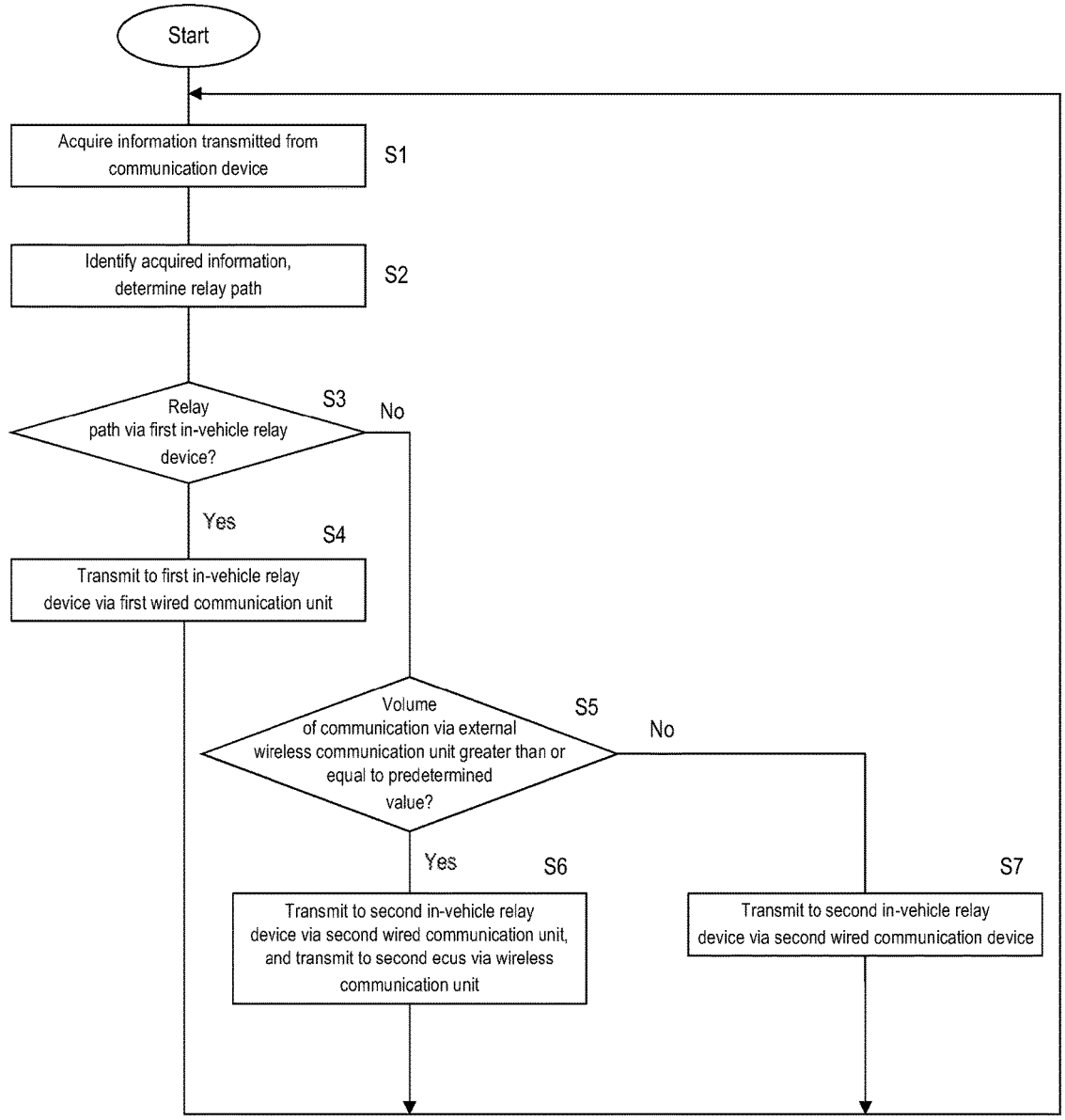
FIG. 4 is a flowchart showing the processing of a control unit according to the first embodiment.

FIG. 4 is a flowchart showing the processing of the control unit 105 according to the first embodiment. The control unit 105 of the wireless relay device 10 performs the following processing based on a predetermined input signal that is input regularly or in cases such as when the ignition switch (IG switch) is turned on.

The control unit 105 of the wireless relay device 10 acquires information transmitted from a communication device outside of the vehicle (step S01). The control unit 105 acquires the information transmitted from the communication device outside of the vehicle that is received by the external wireless communication unit 102. The control unit 105 continues the acquisition of the information, and even while executing the processing, the control unit 105 executes the processing from of step S01 onward, continues the acquisition of the information transmitted from the communication device outside of the vehicle as a background process, for example. The control unit 105 stores the acquired information in a network buffer region that uses a portion of the storage region of the storage unit 106, for example.

The control unit 105 of the wireless relay device 10 identifies the acquired information and determines the relay path (step S02). The control unit 105 references the information stored in the network buffer region and identifies the acquired information by referencing each type of data included in the information and path information that includes, for example, QoS setting files, addresses, or the like stored on the storage unit 106. The control unit 105 determines the relay path of the acquired information based on the results of the identification. In addition, the control unit 105 determines the priority level of the relay processing or the like in the acquired information, based on the result of the identification. For example, if the acquired information includes data related to automated driving and is information related to communication with the first ECUs 31, the control unit 105 determines that the relay path of the acquired information is via the first wired communication unit 107 and the first in-vehicle relay device 21. If the acquired information includes entertainment-related data and is information related to communication with the second ECUs 32, the control unit 105 determines that the relay path of the acquired information is via the second wired communication unit 108 and the second in-vehicle relay device 22. Also, if information related to communication with the first ECUs 31 and information related to communication with the second ECUs 32 is stored in the network buffer region in a predetermined unit time, the control unit 105 performs control such that relay processing of the information related to the first ECUs 31 takes priority over relay processing of information related to communication with the second ECUs 32.

The control unit 105 of the wireless relay device 10 determines whether or not the relay path is a path via the first in-vehicle relay device 21 (step S03). Based on the determination made in the processing of step S02, the control unit 105 determines whether or not the relay path is a path via the first in-vehicle relay device 21 that communicates via the first wired communication unit 107, or a path via the second in-vehicle relay device 22 that communicates via the second wired communication unit 108.

If the path is via the first in-vehicle relay device 21 (YES in step S03), the control unit 105 of the wireless relay device 10 transmits (relays) the information to the first in-vehicle relay device 21 via the first wired communication unit 107 (step S04). By transmitting the information to the first in-vehicle relay device 21, the first ECUs 31 that are connected to the first in-vehicle relay device 21 communicate with the communication device outside of the vehicle via the first in-vehicle relay device 21 and the wireless relay device 10. That is to say that the first in-vehicle relay device 21 and the wireless relay device 10 relay the communication between the first ECUs 31 and the communication device outside of the vehicle.

If the path is not via the first in-vehicle relay device 21 (NO in step in S03), that is to say if the path is via the second in-vehicle relay device 22, the control unit 105 of the wireless relay device 10 determines whether or not the volume of communication via the external wireless communication unit 102 is greater than or equal to a predetermined value (step S05). The control unit 105 derives the volume of communication via the external wireless communication unit 102, that is to say derives the volume of communication received by the external wireless communication unit 102 in a unit time, compares the derived volume of communication and a predetermined value prestored on the storage unit 106, and determines whether or not the volume of communication is larger than the predetermined value.

If the volume of communication is greater than or equal to the predetermined value (YES in step S05), the control unit 105 of the wireless relay device 10 transmits the information to the second in-vehicle relay device 22 via the second wired communication unit 108, and transmits (relays) the information to the second ECUs 32 via the wireless communication unit. Accordingly, the wireless relay device 10 and the second ECUs 32 communicate with use of two communication paths, namely wired communication via the second in-vehicle relay device 22 and wireless communication not via the second in-vehicle relay device 22. The second ECUs 32 connected to the second in-vehicle relay device 22 communicate with the communication device outside of the vehicle via the second in-vehicle relay device 22 and the wireless relay device 10. That is to say that the second in-vehicle relay device 22 and the wireless relay device 10 relay the communication between the second ECUs 32 and the communication device outside of the vehicle. Furthermore, the second ECUs 32 communicate with the communication device outside of the vehicle via the wireless relay device 10 by means of wireless communication, but not via the second in-vehicle relay device 22.

If a plurality of the second ECUs 32 are connected to the second in-vehicle relay device 22, a configuration is also possible in which one of the second ECUs 32 communicates with the communication device outside of the vehicle via the second in-vehicle relay device 22 and the wireless relay device 10 by means of wired communication, and the other second ECUs 32 communicate with the communication device outside of the vehicle via only the wireless relay device 10 by means of wireless communication.

In this way, even if each of the plurality of the second ECUs 32 connected to the second in-vehicle relay device 22 communicate with the communication device outside of the vehicle, the wireless relay device 10 can use two paths in combination with each other, namely wired communication via the second in-vehicle relay device 22 and wireless communication with which direct communication is made with the second ECUs 32. The second ECUs 32 include HMI-related ECUs that process or control large volume data such as video data, for example. Accordingly, even if such large volume data is transmitted from the communication device outside of the vehicle, it is possible to handle the large volume data by using the two communication paths of wired communication and wireless communication.

Also, relay processing or the like is performed with communication with the first ECUs 31 having a higher priority level related to the traveling safety of the vehicle 1 than the second ECUs 32 prioritized over communication with the second ECUs 32 by using the QoS function or the like. Accordingly, even if information related to the communication with the first ECUs 31 and information related to the communication with the second ECUs 32 are mixed in the information received by the external wireless communication unit 102 in a predetermined unit time, the control unit 105 of the wireless relay device 10 performs control so as to preferentially perform relay processing on information related to the communication with the first ECUs 31. Accordingly, by reliably performing relay processing on information related to the communication with the first ECUs 31 having a high priority level related to the traveling safety of the vehicle 1, it is possible to secure the traveling safety of the vehicle 1.

If the volume of communication is not greater than or equal to the predetermined value (NO in step S05), the control unit 105 of the wireless relay device 10 transmits (relays) the information to the second in-vehicle relay device 22 via the second wired communication unit 108 (step S07). That is to say that the control unit 105 does not perform wireless communication with the second ECUs 32 via the wireless communication unit. By wireless communication with the second ECUs 32 not being performed, it is possible to suppress the consumption of power by the wireless communication unit.

After the processing of steps S04, S06, or S07 has been carried out, the control unit 105 of the wireless relay device 10 performs loop processing in which the processing of step S01 is executed again.

The control unit 105 of the wireless relay device 10 determines whether or not the volume of communication performed by the external wireless communication unit 102 is greater than or equal to a predetermined value and uses two communication paths, namely a wired communication path and a wireless communication path, in accordance with the result of the determination, but there is no limitation thereto. The control unit 105 may also reduce or increase the volume of communication with the second ECUs 32 via the in-vehicle wireless communication unit 104 in accordance with the reduction or increase on the volume of communication performed by the external wireless communication unit 102. That is to say that the control unit 105 references a reference value of the volume of communication performed by the external wireless communication unit 102 that is stored in the storage unit 106 in advance and determines the volume of communication with the second ECUs 32 via the in-vehicle wireless communication unit 104 based on a ratio of the volume of communication performed by the external wireless communication unit 102 to the reference value. Accordingly, if the ratio of the volume of communication performed by the external wireless communication unit 102 to the reference value has increased, the volume of communication with the second ECUs 32 performed via the in-vehicle wireless communication unit 104 is increased. If the ratio of the volume of communication performed by the external wireless communication unit 102 to the reference value has decreased, the volume of communication with the second ECUs 32 via the in-vehicle wireless communication unit 104 is decreased.

By the volume of communication with the second ECUs 32 via the in-vehicle wireless communication unit 104 being increased or decreased in accordance with the increase or decrease of the volume of communication performed by the external wireless communication unit 102, it is possible to optimize the power consumed by the in-vehicle wireless communication unit 104 while handling the data volume of the information transmitted from the communication device outside of the vehicle and securing the quality of communication with the second ECUs 32.

The embodiments disclosed in the present embodiment are to be considered examples in all respects and should not be interrupted as being restrictive. The scope of the disclosure is indicated by the claims rather than by the foregoing description, and all changes that come within the meaning and range of equivalency of the claims are intended to be encompassed therein.

The invention claimed is:

1. A relay device to be installed in a vehicle, comprising:
an external wireless communication unit that is configured to perform wireless communication with a communication device that is provided outside of the vehicle;
a wired communication unit that is configured to perform wired communication with an electronic control unit (ECU) for controlling an in-vehicle device that is installed in the vehicle;
an in-vehicle wireless communication unit that is configured to perform wireless communication with the ECU; and
a communication control unit that is configured to identify information transmitted from the communication device and control communication performed by the wired communication unit or the in-vehicle wireless communication unit in accordance with a result of the identification.

2. The relay device according to claim 1, wherein
the ECU includes a first ECU and a second ECU that has a priority level related to traveling safety of the vehicle that is lower than the priority level of the first ECU,
the wired communication unit includes a first wired communication unit that is configured to perform wired communication with the first ECU, and a second wired communication unit that is configured to perform wired communication with the second ECU,
the in-vehicle wireless communication unit is configured to perform wireless communication with the second ECU, and
the communication control unit prioritizes communication between the external wireless communication unit and the first wired communication unit over communication between the external wireless communication unit and the second wired communication unit.

3. The relay device according to claim 2, wherein bandwidth of the first wired communication unit is wider than bandwidth of the second wired communication unit.

4. The relay device according to claim 3, wherein the communication control unit identifies information transmitted from the communication device based on an address of an ECU serving as a destination included in the information transmitted from the communication device or a type content included in the information transmitted from the communication device, and controls communication performed by the wired communication unit or the in-vehicle wireless communication unit in accordance with a result of the identification.

5. The relay device according to claim 3, wherein the communication control unit controls the volume of communication performed by the second wired communication unit and the in-vehicle wireless communication unit based on the volume of communication performed by the external wireless communication unit.

6. The relay device according to claim 3, wherein the first ECU includes an automated driving-related ECU, and the automated driving-related ECU communicates data related to automated driving with the communication device via the external wireless communication unit, and the second ECU includes an HMI-related ECU that controls an HMI-related device that includes an entertainment device, and the HMI-related ECU communicates entertainment-related data with the communication device via the external wireless communication unit.

7. The relay device according to claim 2, wherein the communication control unit identifies information transmitted from the communication device based on an address of an ECU serving as a destination included in the information transmitted from the communication device or a type of content included in the information transmitted from the communication device, and controls communication performed by the wired communication unit or the in-vehicle wireless communication unit in accordance with a result of the identification.

8. The relay device according to claim 7, wherein the communication control unit controls the volume of communication performed by the second wired communication unit and the in-vehicle wireless communication unit based on the volume of communication performed by the external wireless communication unit.

9. The relay device according to claim 7, wherein the first ECU includes an automated driving-related ECU, and the automated driving-related ECU communicates data related to automated driving with the communication device via the external wireless communication unit, and the second ECU includes an HMI-related ECU that controls an HMI-related device that includes an entertainment device, and the HMI-related ECU communicates entertainment-related data with the communication device via the external wireless communication unit.

10. The relay device according to claim 2, wherein the communication control unit controls the volume of communication performed by the second wired communication unit and the in-vehicle wireless communication unit based on the volume of communication performed by the external wireless communication unit.

11. The relay device according to claim 10, wherein the communication control unit increases the volume of communication of the in-vehicle wireless communication unit in communicating with the second ECU, in accordance with an increase in the volume of communication performed by the external wireless communication unit.

12. The relay device according to claim 11, wherein the first ECU includes an automated driving-related ECU, and the automated driving-related ECU communicates data related to automated driving with the communication device via the external wireless communication unit, and the second ECU includes an HMI-related ECU that controls an HMI-related device that includes an entertainment device, and the HMI-related ECU communicates entertainment-related data with the communication device via the external wireless communication unit.

13. The relay device according to claim 5, wherein the first ECU includes an automated driving-related ECU, and the automated driving-related ECU communicates data related to automated driving with the communication device via the external wireless communication unit, and the second ECU includes an HMI-related ECU that controls an HMI-related device that includes an entertainment device, and the HMI-related ECU communicates entertainment-related data with the communication device via the external wireless communication unit.

14. The relay device according to claim 2, wherein the first ECU includes an automated driving-related ECU, and the automated driving- related ECU communicates data related to automated driving with the communication device via the external wireless communication unit, and the second ECU includes an human machine interface (HMI-related) ECU that controls an HMI-related device that includes an entertainment device, and the HMI- related ECU communicates entertainment-related data with the communication device via the external wireless communication unit.

* * * * *